T. H. DECKER.
DETACHABLE ARMREST FOR AUTOMOBILES.
APPLICATION FILED MAY 20, 1921.
1,420,023.                                              Patented June 20, 1922.
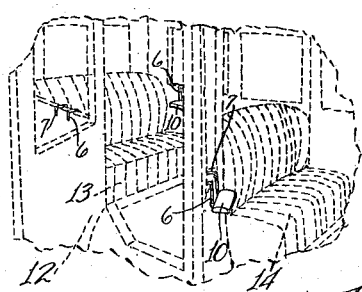
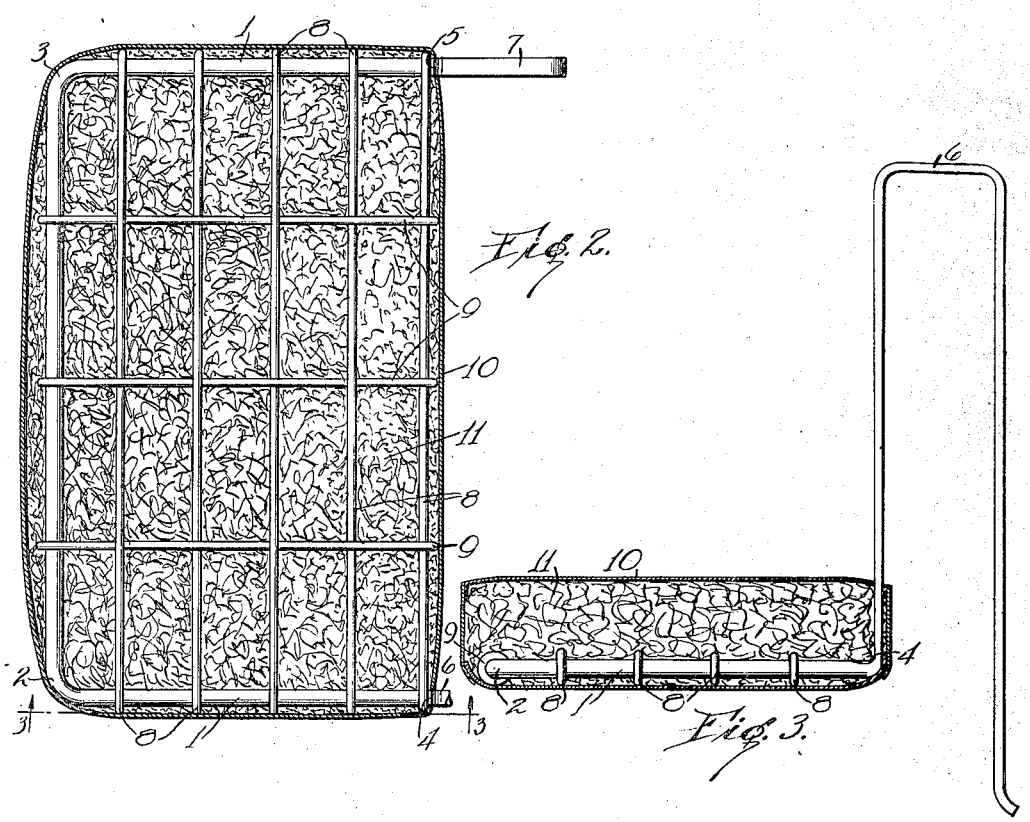
INVENTOR
T. H. Decker
BY
ATTORNEYS

UNITED STATES PATENT OFFICE.

THOMAS H. DECKER, OF CHICAGO, ILLINOIS.

DETACHABLE ARMREST FOR AUTOMOBILES.

1,420,023.

Specification of Letters Patent. Patented June 20, 1922.

Application filed May 20, 1921. Serial No. 471,113.

*To all whom it may concern:*

Be it known that I, THOMAS H. DECKER, a citizen of the United States, and a resident of Chicago, in the county of Cook and State of Illinois, have invented a new and useful Improvement in Detachable Armrests for Automobiles, of which the following is a full, clear, and exact description.

My invention relates to arm rests for vehicles, and it consists in the combinations, constructions, and arrangements herein described and claimed.

An object of my invention is to provide a simple, inexpensive and practical arm rest for an automobile that is adapted to be detachably applied to the automobile frame or body and removed therefrom at will.

A further object of my invention is to provide a device of the character described that can be placed in operative position with respect to the body of an automobile and removed therefrom without the use of any tools.

A further object of my invention is to provide a device of the character described that is strong and durable and occupies but little space when not in use so that it may be readily carried in a tool box or the like.

Other objects and advantages will appear in the following specification, and the novel features of the invention will be particularly pointed out in the appended claims.

My invention is illustrated in the accompanying drawings, forming part of this application, in which—

Figure 1 is a view of a portion of an automobile body, showing the device operatively applied, Figure 2 is a plan view of a fragmentary portion of the device, portions thereof being broken away, and Figure 3 is a section along the line 3—3 of Figure 2.

In carrying out my invention, I make use of a single piece of wire which is bent at 2 and again at 3 to provide a substantially U-shaped body portion 1, as best seen in Figure 2. The arms of the U-shaped body portion 1 are bent at right angles as at 4 and 5 respectively and are then fashioned into parallel hook members indicated at 6 and 7. The U-shaped portion 1 has spaced apart parallel tie-wires 8 between the arms thereof and other spaced apart parallel tie-wires 9 that are transverse to the tie-wires 8, thereby providing a supporting frame having integral U-shaped hook members. This frame is provided with a cover 10 that is formed of any suitable material, such as leather or other fabric. The cover 10 is placed upon the frame and is filled with a suitable padding 11, such as cotton batting. The major portion of the padding 11 is disposed above the crossed tie-wires 8 and 9, as clearly shown in Figure 3, so that the maximum of comfort is attained when an occupant of the vehicle to which the device is applied, rests his arm upon the frame. The hook portions 6 and 7 of the device are preferably flattened so as to more closely engage a vehicle body.

From the foregoing description of the various parts of the device, the operation thereof may be readily understood. In Figure 1, I have shown a portion of an automobile body 12 having a plurality of my improved arm rests applied thereto. It will be observed that the hook members 6 and 7 are adapted to engage the side of the body at its upper edge or the upper edge of a window frame in the body. The device is arranged in a desired position with respect to a seat 13 of the vehicle. The occupants of the vehicle sitting at the ends of the seat 13 may rest their arms upon the devices, thereby materially increasing their comfort. When the device is positioned adjacent to the driver's seat 14, as also illustrated in Figure 1, the driver of the automobile may rest his arm thereon when manipulating the steering wheel or other operating parts of the device, thereby lessening the strain ordinarily occasioned on account of the necessity of maintaining the arms in raised position.

The device is simple in its construction and can be instantly applied in a desired position with respect to a vehicle seat. When not in use, it may be carried about readily, as in a tool box of the vehicle, without taking up much space.

I claim:

1. A device of the character described comprising a U-shaped wire having its ends flattened and projected at right angles to the plane of the U-shaped portion, said ends being fashioned into hooks, cross wires carried by the U-shaped portion of said first named wire, padding carried by said cross wires, and a cover disposed around said padding.

2. A device of the character described comprising a wire bent into a U-shaped portion and into a pair of hooks, said hooks extending at right angles to the plane of the U-shaped portion, cross wires carried by said U-shaped portion and constituting a frame, padding disposed above and below said frame, said padding being of greater thickness above said frame than below, and a cover disposed around said frame and being adapted to enclose said padding.

THOMAS H. DECKER.